United States Patent [19]

Hofmann et al.

[11] 4,150,964

[45] Apr. 24, 1979

[54] APPARATUS FOR COATING GLASSWARE

[75] Inventors: William E. Hofmann; Alton W. Long, both of Toledo, Ohio

[73] Assignee: Owens-Illinois, Inc., Toledo, Ohio

[21] Appl. No.: 763,768

[22] Filed: Jan. 31, 1977

[51] Int. Cl.² ...................... C03C 17/00; C03C 35/02; C03C 39/00
[52] U.S. Cl. ......................................... 65/181; 118/48
[58] Field of Search .................. 118/48, 49, 49.1, 49.5, 118/312, 326; 65/60 B, 181; 427/248 G, 248 H

[56] References Cited

U.S. PATENT DOCUMENTS

| | | | |
|---|---|---|---|
| 2,813,045 | 11/1957 | Abbott, Jr. | 118/48 X |
| 2,982,052 | 5/1961 | Lawson | 65/181 X |
| 3,402,038 | 9/1968 | Hordis | 65/181 X |
| 3,573,888 | 4/1971 | Bogart | 118/48 X |
| 3,842,793 | 10/1974 | Novice et al. | 118/326 X |
| 3,952,118 | 4/1976 | Novice | 118/48 X |
| 3,989,004 | 11/1976 | Scholes | 118/48 |

FOREIGN PATENT DOCUMENTS 2350960  4/1975  Fed. Rep. of Germany .......... 65/60 B

*Primary Examiner*—Wm. Carter Reynolds

*Attorney, Agent, or Firm*—D. T. Innis; Myron E. Click; David H. Wilson

[57] ABSTRACT

This invention relates to the art of coating glassware while the ware is moving through an annealing lehr which is provided with a cooling section near the exit end of the lehr. The cooling section is of the continuous recirculation type providing an arrangement for generally cooling the ware to a relatively even temperature even though the ware is moving through the lehr in multiple rows and columns. The ware is moved through the lehr on a lehr belt which is formed as a webbed belt and constitutes a foraminous conveyor. A lubricious material in the form of a vapor or mist of an organic, nonmetallic coating material selected from the group consisting of polyolefins, fatty acids and their derivatives is injected into the recirculating cooling air in the cooling section of the lehr to thereby form a durable lubricious coating on the exterior surfaces of the glass article. The articles, at the time they are passed through the cooling section, will be at a temperature between 200° F. and 400° F. The vapor generator used to form the vapor or mist has an outlet tube of at least one foot in length extending vertically from the generating chamber to avoid injection of any condensate into the cooling section of the lehr.

3 Claims, 4 Drawing Figures

APPARATUS FOR COATING GLASSWARE

BACKGROUND OF THE INVENTION

It has been suggested, as taught in U.S. Pat. No. 2,813,045, to coat glassware with an organic material, such as a water soluble wax, by introducing the wax in vapor form into the cooling section of a lehr by injecting the wax in steam, introduced beneath the lehr mat or belt. The heated containers that would pass into the cooling section of the lehr are cooled by radiation and convection of air moving upwardly through louvres provided in the top of the lehr. The upwardly moving vapor cloud would pass out of the lehr into the surrounding atmosphere. With such an arrangement as disclosed in the above-referred-to patent, the vapor moves upwardly and, in effect, is blown upwardly over the glass surfaces thus avoiding any appreciable accumulation of vapor within the interior of the bottles. However, a substantial amount of vapor will necessarily escape into the atmosphere surrounding the lehr.

In a more recent patent, U.S. Pat. No. 3,989,004, apparatus for applying a substantially uniform thin lubricious coating to the exterior of glass containers is disclosed in which a separate, heated chamber is provided downstream of the annealing lehr. This chamber recirculates the air therein, over the ware placed therein. However, in this system it is necessary that the air be heated in order to provide an atmosphere which is within a restricted temperature range of between 180° F. and 400° F. in order for the coating material to adhere to glass surfaces. The ware, as explained, must be at a temperature which is compatible to the formation of the coating thereon.

Other methods have been suggested for applying coatings to the surface of glass articles after they have been annealed. One of these would require dipping of the ware into a liquid coating material solution or spraying such a solution onto the ware. While both dipping and spraying of the ware to provide coating have been used to a considerable degree, both have generally failed to be commercially accepted because of the lack of uniformity of the coverage or difficulty in application of the coating, excessive coating on more acceptable surfaces and inability to adequately coat closely spaced articles such as those being conveyed through an annealing lehr.

The requirement of the glassware being at an elevated temperature at the time a vapor contacts the ware has resulted in the ware being treated after the annealing has been completed. One of the features of applicants' invention is the ability to treat ware in the cooling section of the lehr itself. In order to do this with any degree of uniformity, it is necessary that the cooling section be what is termed a recirculating cooling section since this type of cooling section cools the entire lehr mat of ware to a generally uniform temperature. The uniformity of the temperature is important when coating the ware by movement of a vapor or mist of organic, non-metallic coating material into contact with the ware surface. It is highly desirable that the surface of the ware be at a temperature of between 200° F. and 400° F. It has been found by applicants that when the temperature is below 200° F. at the time the ware leaves the cooling section, the coating produced on the ware frequently results in the ware being unacceptable from the standpoint that it will not permit adequate adherence of labels to the ware. In the event the temperature of the ware is above 400° F., there is the distinct tendency for the ware to be insufficiently coated to provide the degree of lubricity which is believed necessary to provide adequate protection of the ware against scratching or abrasion in the later handling of the ware through normal filling lines.

SUMMARY OF THE INVENTION

Method and apparatus for applying a lubricious coating to glass articles which are moving through a recirculating, cooling section of an annealing lehr in which a mist of an organic non-metallic coating material selected from the group consisting of polyolefins, fatty acids and their derivatives is introduced into the recirculating, cooling air within the cooling section of the lehr.

DETAILED DESCRIPTION OF THE DRAWINGS

Figure 1:
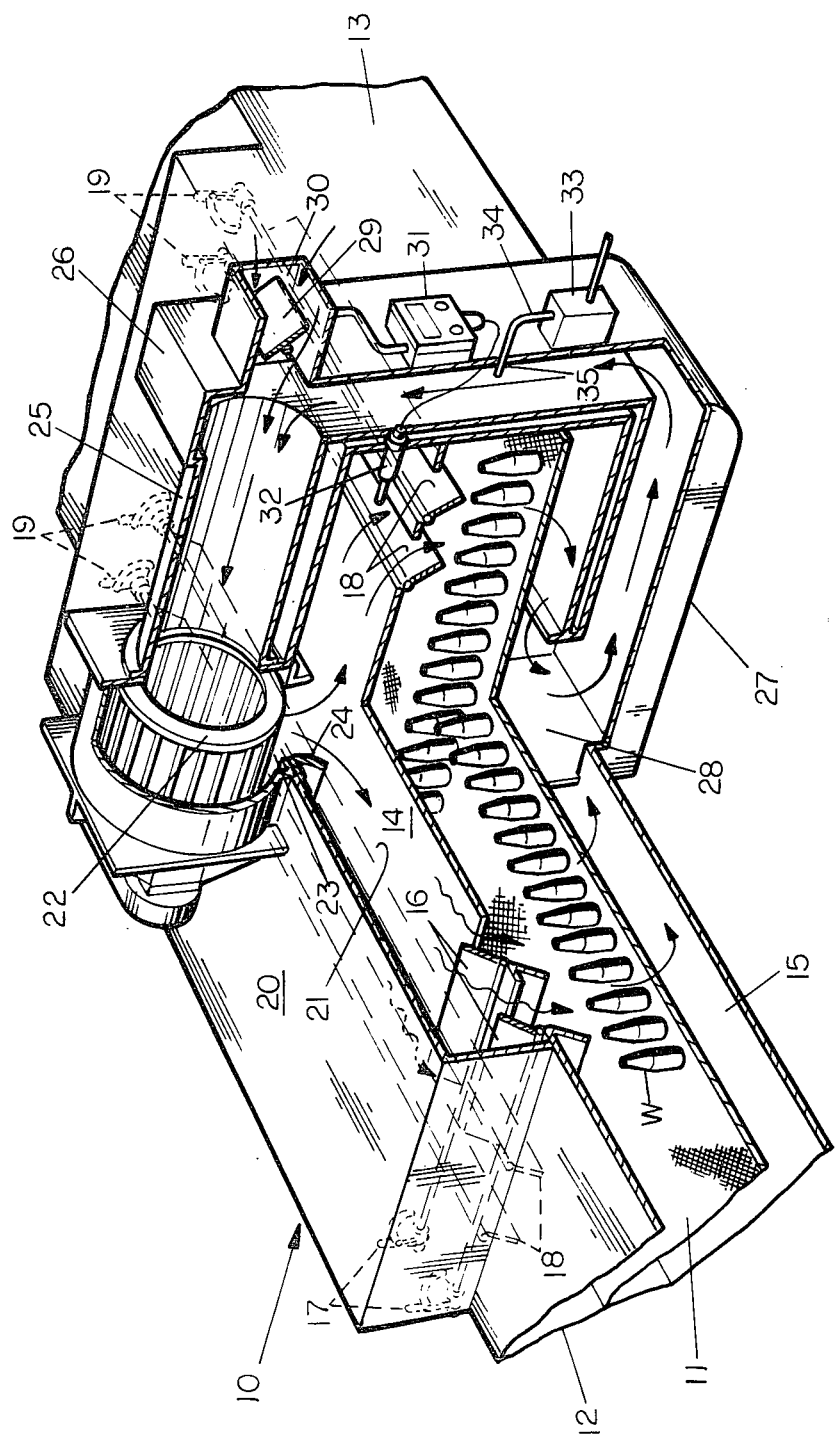
FIG. 1 is a perspective view of one embodiment of an equalizing cooling section with a mist applicator connected thereto.

Cooling sections within the annealing lehrs for glass containers are of various designs and, depending upon the design, have varying degrees of effectiveness with regard to cooling the ware adjacent the outlet of the lehr. Where it is only desirable to cool the ware, these cooling sections may typically be of the type where the top of the lehr is open to the atmosphere and, for example as shown in U.S. Pat. No. 3,259,481 in FIGS. 5 and 13, cold air is forced into the area beneath the lehr mat by a blower and the air then is pushed or flows through the lehr mat, past the ware positioned thereon, to be exhausted through the open top of the lehr. Such an arrangement will generally provide sufficient cooling distribution so as to cool the ware equally well across the width of the lehr. In the event, however, it is desirable to control the temperature of the atmosphere within the lehr to a finite value so that the atmosphere and the ware will be at a temperature around 300° F., for example when applying a thin coating of an organic material to the exterior surfaces of the ware, it is important that the ware be cooled in such a manner that each piece of ware achieves a fairly equal degree of temperature across the width of the lehr so that the application of the organic material or compound, such as oleic acid vapor, to the ware will be relatively uniform. To avoid wasting such oleic acid vapor, applicants have found that it is desirable to provide an equalizing cooling section in the lehr in which the air is recirculated. By having the air generally confined to that section of the lehr where the ware is being cooled, the air may be recirculated and oleic acid vapor or mist injected into this air will coat containers as they pass through the lehr in a uniform manner. The concentration of the vapor within the atmosphere of the lehr is only critical to the extent that there should be sufficient vapor to provide a micro-molecular layer of the material on the containers. It has been found that the vapor coating composition tends to adhere strongly on newly formed glassware and resists superfluous coating on already coated glassware. This phenomenon tends to preclude uneconomical coating of the glassware and as long as a sufficient concentration of vapor is present in the equalizing cooling section, or rather in the recirculating air which is present in this section, an adequate protective lubricious coating will be applied to the ware.

The foregoing description will be generally limited to the formation of a lubricious coating on the bare ware, but would have equal application to the treatment of ware which may have a metallic oxide coating applied thereto prior to passing into the annealing lehr. Examples of such organic metallic compounds would be tin compounds such as stannic chloride and stannous fluoride. Titanium compounds such as titanium tetrachloride or tetra-isopropyl titanate likewise have been found to be particularly useful in producing a titanium dioxide coating on glass articles. The oxide coating is very thin, usually in the range of 40-120 microns in thickness.

With reference to the drawings, and in particular FIG. 1, there is shown a recirculating air, equalizing cooling section 10 through which a lehr belt 11 is moving from left to right. The lehr belt 11 is a foraminous web through which air may circulate. The cooling section 10 is formed of side walls 12 and 13, a top wall or generally imperforate ceiling 14 and bottom wall 15, all of which effectively form an enclosure surrounding the lehr belt 11 and, in effect, define a tunnel through which the lehr belt transports ware "W". The ceiling or top wall 14 of the cooling section 10 is provided with first louvre means in the form of transverse louvres 16 extending across the width thereof at what might be termed the inlet end of the cooling section 10. The angular position of these louvres is controlled by levers 17 which may be turned and locked in adjusted position. The ceiling or top wall 14 is provided with second louvre means in the form of parallel louvres 18 adjacent the sides thereof whose openings may be controlled by the adjustment of levers 19 similar to levers 17, it being understood that the levers 17 and 19 extend through the side walls and the shafts which carry the louvres are connected to the levers. That portion of the top wall or ceiling 14 within which the louvres 16 and 18 are positioned is covered by an enclosure 20, thus forming a manifold or chamber 21 overlying the ceiling 14 of the cooling section 10. A blower 22, driven by a suitable motor, has its output 23 in communication with a duct 24 which extends through an opening in the upper wall of the enclosure 20. The blower 22 has an inlet duct 25 connected thereto, the opposite end of the inlet duct is in communication with a vertical flow header 26. The header 26 extends downward from its connection to inlet duct 25 to a position below the bottom wall 15 of the cooling section 10 and blends or connects with a horizontal duct 27 which, in turn, is in communication at 28, with the interior of the cooling section adjacent the center thereof beneath the lehr mat or belt 11. Thus it can be seen that air which is moved by the blower 22 will enter the chamber 21 and pass through the louvres 16 and 18 and sweep across the ware on the belt 11 by reason of the inlet to the blower being fed from the opening 28 at the bottom of the cooling section communicating with the duct 27, header 26 and duct 25. To control the temperature of the air within this cooling section, cooler, ambient air from outside will be drawn into the recirculating air system past a damper 29 in a side opening duct 30 communicating with the interior of the header 26. The position of the damper 29 is controlled by temperature controller 31 in response to the temperature sensed by temperature pick-up 32. As can readily be appreciated, the angular position of damper 29 will determine the volume of cooler air drawn into the cooling section.

A coating material vapor generator 33 shown in FIG. 1 is positioned below the temperature control 31. The vapor generated passes through a vertical delivery pipe 34 whose vertical length immediately above the generator 33 is at least one foot in length so that any condensed vapor will flow back down into the generator. The pipe 34 has its upper end extending through the wall of the header 26 at 35. Thus the vapor or mist produced by the generator 33 will enter the header 26 from the pipe 34 to be entrained in the recirculating air with the result that the ware "W" will be coated by the deposition of the vapor thereon.

Figure 2:
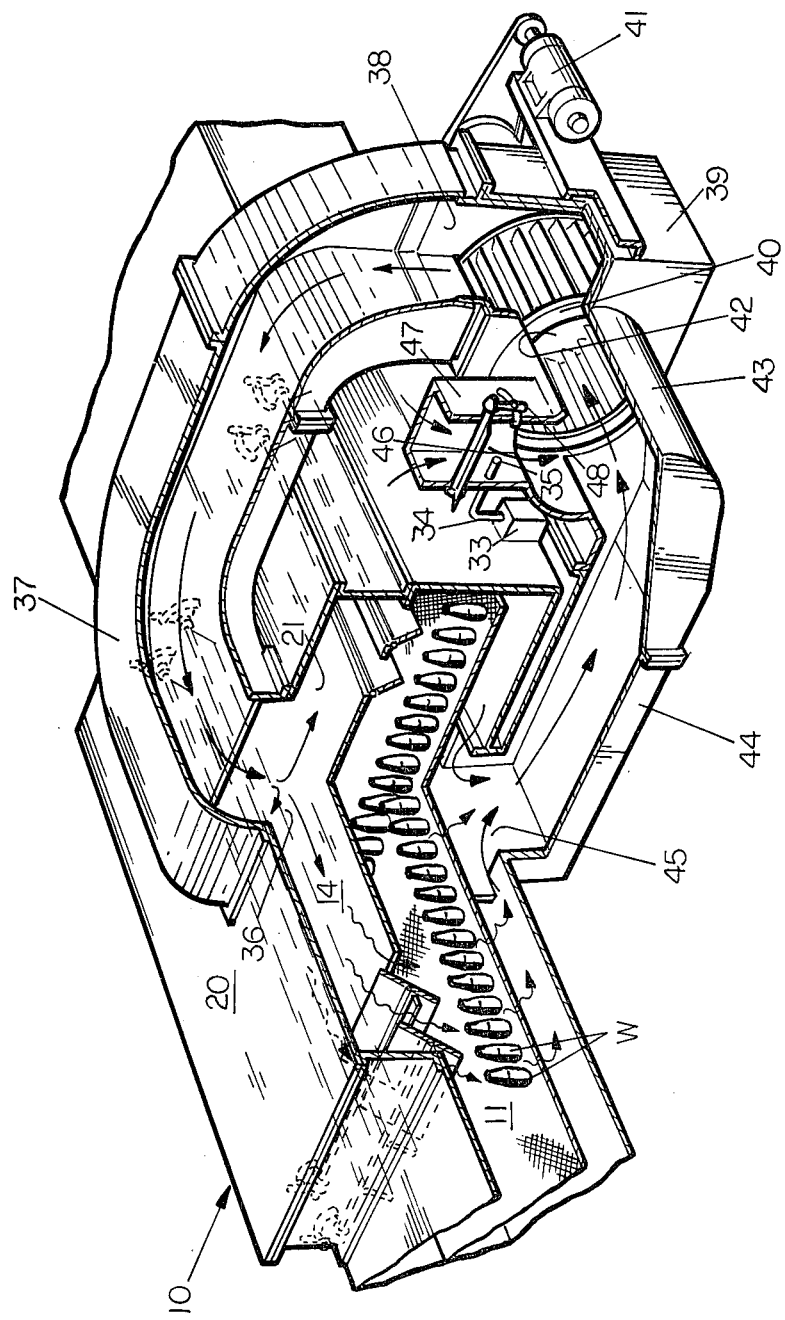
FIG. 2 is a perspective view of a second embodiment of an equalizing cooling section of a lehr mist with a coating mist generator.

With particular reference to FIG. 2, a modified form of the apparatus disclosed in FIG. 1 is shown. Generally speaking, the apparatus of FIG. 2 is a "low profile" equalizing cooling section which will effectively cool ware evenly. In some installations, having the blower at near floor level may be advantageous. The basic cooling section is substantially the same as FIG. 1 and like reference numerals are applied to similar apparatus.

The cooling section 10 for the lehr has side walls, top wall or ceiling and bottom wall essentially identical to that previously described with respect to FIG. 1. Louvres are provided in the generally imperforate ceiling or top wall 14 and the enclosure 20 above the ceiling 14 forms a chamber 21. An opening 36 in the top of the enclosure 20 is in communication with a duct 37. The duct 37 extends from the opening 36, over the top of the enclosure 20 and to one side thereof, and extends vertically downward to an outlet 38 of a blower 39. The blower 39 has a bladed rotor 40 which is driven by an electric motor 41 through a suitable belt and pulley system. The rotor 40 is of the hollow drum or barrel type which has its inlet 42 connected to a generally horizontal duct 43, with the duct 43 being connected to a lower duct 44 that is in communication with an opening 45 in the bottom wall 15 of the cooling section of the lehr. Operation of the blower 39 results in air being blown, from above through the louvred ceiling or top wall 14, to sweep across the ware, pass through the lehr mat 11, and be drawn back into the blower through the lower opening 45 and ducts 43 and 44. The temperatures of the air within the cooling section is adjustable by the positioning of a damper 46 in a vertical header 47 that opens into the duct 43. The setting of the damper 46 may be changed by hand by positioning a lever 48 connected thereto or may be controlled in the same manner as the damper 29 of FIG. 1 is controlled in accordance with the temperature of the atmosphere within the cooling section of the lehr. The vapor generator 33 of identical construction to that disclosed in FIG. 1 and as shown in detail in FIG. 4, has its delivery pipe 34 opening into the header 47 at 35.

As is the case with FIG. 1, the apparatus disclosed in FIG. 2 effectively provides temperature control to the atmosphere within the lehr by recirculating cooling air through the lehr and provides a lubricating coating to the ware by entraining in the cooling air an organic coating materials such as oleic acid vapor.

Figure 3:
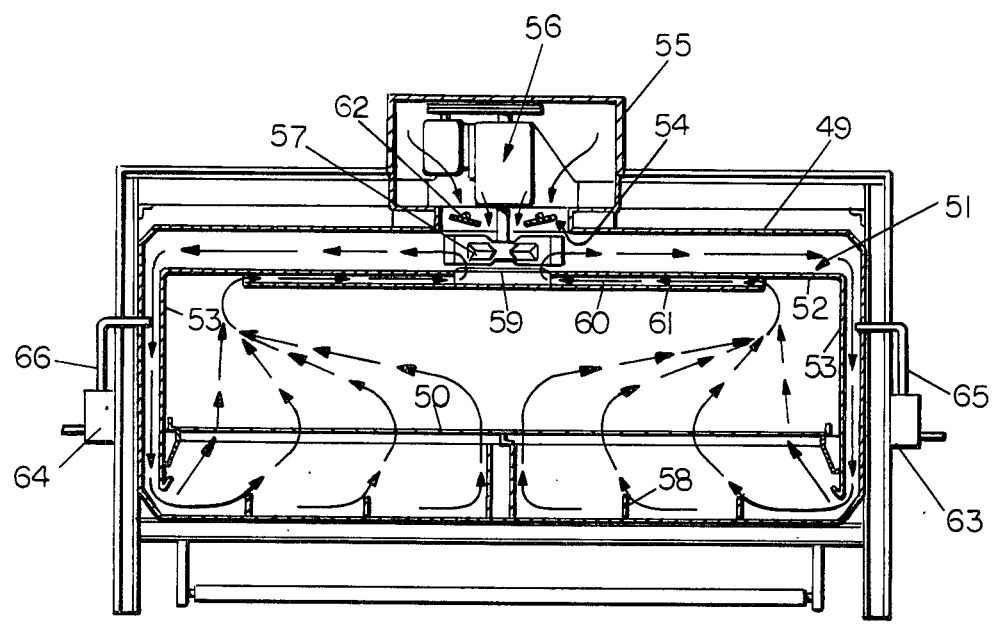
FIG. 3 is a cross-sectional view of a third embodiment of an equalizing cooling section with a coating mist generator.

With reference to FIG. 3, an example of a commercial equalizing cooling section from E. W. Bowman, Inc. of Uniontown, Pennsylvania, is shown in vertical cross-section. Generally speaking, the cooling section of the Bowman lehr comprises an outer tunnel 49 which effectively surrounds a lehr mat 50. Within the tunnel 49, there is an elongated hood member 51 composed of a top wall 52 and side walls 53. The side walls 53 extend downwardly to beneath the level of the lehr mat 50 and are spaced inwardly from the side walls of the tunnel 49. The top wall 52 also is spaced downwardly from the top of the tunnel 49. A central opening 54 in the top of the tunnel 49 has a support housing 55 mounted thereover. The housing 55 carries a motor driven fan, generally designated 56, with the output shaft of the fan 56 extending downwardly to blades 57 positioned within the space between the top wall of the tunnerl 49 and the top wall 52 of the hood 51. The blade portion of the fan is concentric with respect to the opening 54 and rotation of the blades 57 results in the movement of air in the direction of the arrows extending radially from the fan blades. Air will circulate down the sides between the hood side walls 53 and the tunnel side walls to sweep across beneath the lehr mat 50. A plurality of vertical deflector plates 58 cause the sweeping air to move upwardly through the lehr mat and sweep past the ware positioned on the mat 50. An inlet to the fan blades 57 is by way of an opening 59 in the top wall 52 of the hood 51. Air arrives at the opening 59 through a gap 60 formed between a panel 61 and the top wall 52 of the hood 51. Panel 61, in effect, acts as a baffle to create a flow pattern of air within the lehr in the manner illustrated by the arrows in FIG. 3. Ambient air may be controllably introduced into the lehr through the opening 54 by the proper, selective positioning of dampers 62.

Since the Bowman lehr cooling section functions almost as if it were in two separately operating systems on either side of the center of the lehr, the introduction of a vapor coating material to this circulating cooling air section is preferably accomplished by the use of two vapor generators 63 and 64. These vapor generators 63 and 64 have their delivery pipes 65 and 66, of at least one foot in vertical height, opening into the downwardly flowing stream of air between the hood side walls 53 and the side walls of the tunnel 49. In this manner the vapor is carried with the air downwardly and then upwardly past the ware positioned on the mat 50 to effectively apply a lubricious surface coating to the ware passing through the cooling section of the annealing lehr.

Figure 4:
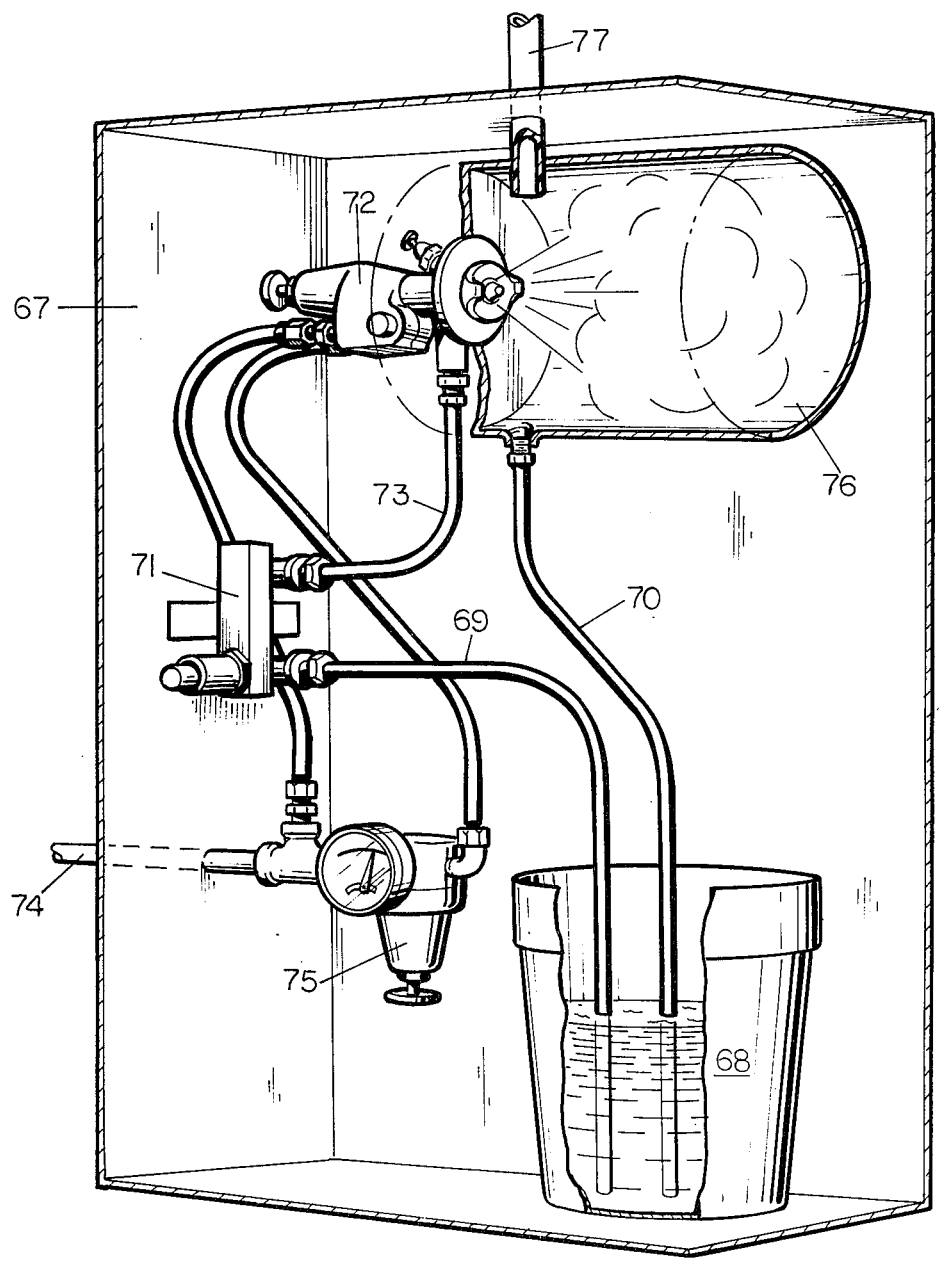
FIG. 4 is an enlarged view of a mist generator with parts broken away to show the physical arrangement thereof.

A suitable vapor generator, shown in detail in FIG. 4, generally speaking, is contained within a housing 67. A supply of liquid organic, non-metallic coating material is provided in a container 68 in which the end of a pair of pipes 69 and 70 is immersed. The pipe 69 is connected to the inlet of a flow metering device 71. The outlet of the flow meter is connected to an AGB DeVilbiss spray gun 72 by pipe 73. Air under pressure enters the system through an inlet pipe 74. The air supply is connected through an air regulator 75 to the spray gun 72. Spray gun 72 is mounted so as to deliver the vapor or mist to the interior of a vaporizing chamber 76. A vapor delivery pipe or outlet 77, which conveniently may be made of a piece of clear plastic tubing, corresponds to the delivery pipes 34 and 65 and 66 of FIGS. 1-3. The pipe 70 is connected to the lower side of the chamber 76 so that any vapor or mist which may condense in the tubing 77, or within the vaporizing chamber, will be returned to the coating material supply in the container 68.

As an example of the operation of the ware coating system, the air pressure to the spray gun was in excess of 65 P.S.I. and the fluid flow was approximately 20 cc/min. Equating this operation to surface treating a full lehr of ware which has a residence time in the lehr of apporoximately 30 minutes, with the lehr mat moving at about a rate of two and one-half feet per minute the particle size of the vapor being in the range of 1-10 microns, the quantity of coating liquid used will be between a half pint to a pint per day of operation. While the vapor generator has been shown in some detail in FIG. 4, it should be readily appreciated that other suitable vapor generating equipment could be utilized. However, that which is shown has been found to be well suited to the particular application of oleic acid mist to the circulating air within the recirculating type equalizing cooling section of an annealing lehr.

We claim:

1. Apparatus for applying a lubricious coating to newly formed glassware that are in the process of being annealed in an annealing lehr of the type where the ware are arranged in rows and columns on a porous lehr belt conveyor and are still at a temperature of between 200° F. and 400° F., comprising:
    an equalizing cooling section, surrounding a section of the conveyor, said conveyor moving ware through the cooling section;
    a blower or fan connected to said cooling section for circulating air around the ware in said cooling section;
    a generally imperforate ceiling extending over the ware in the section;
    first louvre means in said ceiling extending across the width of said section at the upstream thereof;
    second louvre means in said ceiling extending parallel to the movement of ware on said conveyor;
    a chamber enclosing the upper surface of said ceiling;
    duct means extending from the outlet of said blower to the chamber;
    return duct means from beneath the lehr belt to the inlet of the blower;
    means for introducing ambient air to the inlet side of said blower in controlled quantities;
    at least one means for generating a mist of an organic, non-metallic coating material selected from the group consisting of polyolefins, fatty acids and their derivatives;
    means for carrying the mist from the generator in a vertically upward path of at least one foot and for introducing the mist into the circulating air within the cooling section to thereby apply a lubricious coating to the ware as it passes through the section.

2. The apparatus of claim 1, wherein the blower is mounted above the chamber.

3. The apparatus of claim 1, wherein said blower is mounted at the side of the lehr cooling section.

* * * * *